United States Patent Office 3,119,842
Patented Jan. 28, 1964

3,119,842
PROCESS FOR THE SYNTHESIS OF MEVALONIC ACID AND ITS LACTONE AND DERIVATIVES THEREOF
Frank H. Hulcher, 2569 Alderney Lane, and Thomas A. Hosick, 2024 Colonial Place, both of Winston-Salem, N.C.
No Drawing. Filed Mar. 22, 1961, Ser. No. 97,436
4 Claims. (Cl. 260—343.5)

Mevalonic acid has been recognized and established in the literature as being a naturally occurring compound. It has been isolated and also characterized. The structures of the acid and the lactones are shown by the following formulae.

(1)
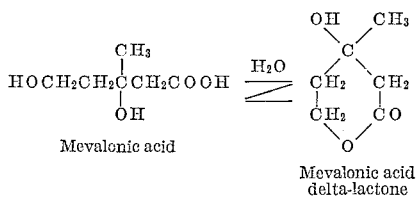

Mevalonic acid ⇌ Mevalonic acid delta-lactone

As indicated by the above formulae and equation the acid and the lactone are equilibrium products in synthesis thereof and they are also equivalent biologically. The pure lactone exists only under completely anhydrous conditions. Most commercial preparations are mixtures of the acid and lactone.

Our invention relates more particularly to a method for the synthesis of the intermediate, 4-(halogenacetoxy)-2-butanone having the general formula (2)
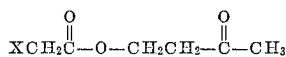

In which X stands for Cl or Br from which the acid and the lactone may, in accordance with our invention, be prepared by a cyclization reaction of the Reformatsky type as will be more fully described hereinafter.

The detailed procedure for the synthesis of the intermediate ester, 4-(bromoacetoxy)-2-butanone and cyclization of this compound by an internal Reformatsky reaction to form mevalonic acid lactone is presented below. This constitutes the specific examples of our process.

Preparation of 4-(bromoacetoxy)-2-butanone.—A 3-neck, 500 ml., round bottom, reaction flask was fitted with a stirrer, a condenser attached to a tube with calcium chloride, and an addition funnel. Then, 45.0 ml. of anhydrous chloroform and 40.7 ml. (40.9 g., 0.464 mole) of 4-hydroxy-2-butanone (Eastman Organic Chemicals Cat. No. 7824, redistilled: B.P. 63–4° C., 7 mm.) was added to the flask and the contents cooled in a Dry Ice-ethyl alcohol bath. Next, 43.1 ml. (99.6 g., 0.475 mole) of bromoacetyl bromide was added slowly, with stirring from the funnel. This was followed by dropwise addition of 38.3 ml. (37.6 g., 0.475 mole) of anhydrous pyridine. The mixture was allowed to warm up to 4° C. and to stand for two days at this temperature.

The crystallized pyridine hydrobromide (35 g.) was removed by filtration, and ca. 200 ml. of ether was added. The resulting ethereal solution was washed with two 75 ml. portions of water, and the combined water washings were extracted with two 75 ml. portions of ether. These extracts were added to the first ether-chloroform solution which was dried over anhydrous sodium sulfate. The solution was concentrated in vacuo to give the crude ester along with some acid. This operation was carried out below 4° C. since the ester decomposes rapidly at room temperature. Solid sodium bicarbonate was added, followed by 125 ml. of water. Additional sodium bicarbonate was added until effervescence ceased and the water was neutral to slightly alkaline. This mixture was extracted four times with 75 ml. portions of ether, dried over anhydrous calcium chloride, then re-dried over anhydrous sodium sulfate following the removal of calcium chloride. The ester solution was finally concentrated in vacuo in the cold (below 0° C.) to give 57.8 g. (59.6% of the theoretical amount) of 4-(bromoacetoxy)-2-butanone. At no time was the temperature allowed to rise above 4° C. throughout the procedure.

Identification of this new compound, 4-(bromoacetoxy)-2-butanone, is supported by its infrared spectrum. This data is presented in a table below along with that obtained for other esters. The elemental analysis further supported this data. The ester contained carbon, 34.80%; hydrogen, 4.46%; and bromine, 40.29% to give an empirical formula of $C_6H_9O_3Br$. In addition, this ester will undergo an internal Reformatsky reaction to form mevalonic acid delta-lactone as one derivative as appears below. The new ester is quite unstable at room temperature as is the 4-acetoxy-2-butanone, only more so. It is stored in a deep freezer, very tightly stoppered and it keeps well this way. All attempts to distill the 4-(bromoacetoxy)-2-butanone, under any conditions of pressure and temperature have resulted in a decomposition to methyl vinyl ketone and bromoacetic acid.

Preparation of mevalonic acid delta-lactone.—A solution of 20 ml. (29.0 g., 0.139 mole) of 4-(bromoacetoxy)-2-butanone and 20.0 ml. of tetrahydrofuran, previously distilled from sodium, was prepared and kept for use below 4° C. A 125 ml. round bottom flask was fitted with a reflux condenser; and 10.0 g. of granular zinc which had been treated with dilute hydrochloric acid, washed with water, washed with water containing 0.02 g. of cupric chloride, washed with ethyl alcohol several times, and then with dry ether several times, was added to the flask.

About 3.0 ml. of dry tetrahydrofuran and 4.0 ml. of the 4-(bromoacetoxy)-2-butanone was added to the zinc. By removing the reflux condenser the solvent was carefully boiled away until a self-supporting, exothermic, reaction commenced. The Grignard reaction is not recommended for starting this reaction. In order to prevent decomposition from too high temperature, more dry solvent was added at such a rate that the reaction does not stop. The remaining ester solution was added at such a rate as to keep the reaction progressing. Then 10.0 g. more of the specially prepared zinc (total of 0.3 mole), was added at the half-way point. After addition of the ester was completed, the reaction mixture was refluxed for 30 minutes. Care should be taken that sufficient solvent is present to prevent a temperature much higher than its boiling point from occurring.

Procedure for isolation of mevalonic acid lactone from the reaction mixture.—Add an equal volume of water to the reaction mixture to hydrolyze the zinc adduct. Then add an equal volume of ethanol to precipitate salts. Centrifuge off the salts and wash the salt with absolute ethanol until the supernatant is colorless (filtration may be used also). Combine the ethanol washings with the first supernatants solution and evaporate any methyl vinyl ketone along with the ethanol in vacuum below 50° C.

Add KOH solution until basic and allow the mixture to stand at 60° C. for 10 minutes until all the lactone is converted to the acid. Cool and adjust to pH 1.0 with $H_2SO_4$ solution. Extract with 1% ethanol in chloroform 5 times or until no more acid is extracted. The chloroform extract is evaporated in vacuum and a brown viscous product results. A small amount of chloroform is added to reduce the viscosity and about 5 volumes of benzene are added. This mixture is placed on a column of about 50 gm. of silicic acid prepared as follows. The silicic acid is first mixed with 54 ml. of 0.5 N $H_2SO_4$, slurried in benzene, and poured in a glass column and packed. The sample is then placed on the column in benzene as stated above and the column washed with benzene. The lactone is then eluted from the column with chloroform. The colored material remains on the column. The chloroform eluate is then evaporated in vacuum below 37° C. to give the colorless lactone. The chromatographic procedure may be repeated if any color is present.

*Other 4-(haloacetoxy)-2-butanone compounds.*—The 4-(chloroacetoxy)-2-butanone, 4-(dichloroacetoxy)-2-butanone, and 4-(trichloroacetoxy)-2-butanone esters are prepared by the same procedure as given for the preparation of 4-(bromoacetoxy)-2-butanone, except that chloroacetyl chloride, dichloroacetyl chloride and trichloroacetyl chloride are substituted for bromoacetyl bromide, respectively. These intermediates may be used to prepare mevalonic acid by our procedure, but are less successful than the 4-(bromoacetoxy)-2-butanone. Similarly the di- and tribromoacetyl bromides and the mono-, di- and tri-iodo-acetyl iodides may be used to produce the corresponding 4-(halogenacetoxy)-2-butanones. It is also within the scope of our invention to substitute magnesium for zinc in the foregoing example.

*Infrared Bands of Esters of 3-Keto-n-Butanol, Cm.$^{-1}$*

| Bromo-acetate | Chloro-acetate | Dichlor-acetate | Trichloro-acetate |
|---|---|---|---|
| 2940 | 2940 | 2940 | 2940 |
| 1740 | 1750 | 1758 | 1766 |
| 1710 | 1713 | 1716 | 1717 |
|  |  | 1457 (weak) | 1445 |
| 1418 | 1412 | 1424 (weak) | 1424 (shoulder) |
|  |  | 1383 (shoulder) | 1380 (shoulder) |
| 1360 | 1365 | 1351 | 1365 |
| 1316 (shoulder) | 1313 | 1305 (broad) | 1314 (weak shoulder) |
| 1284 | 1292 (shoulder) |  | 1242 |
|  | 1185 (shoulder) |  |  |
| 1165 | 1165 | 1171 | 1167 |
| 1110 (weak) |  |  | 1110 (weak shoulder) |
|  | 1094 (shoulder) | 1090 (weak) | 1095 (weak) |
| 1042 | 1042 | 1038 | 1027 (shoulder) |
| 1013 | 1013 | 1010 | 1018 |
| 950 | 950 | 950 | 966 |
| 890 |  |  | 881 |
|  |  |  | 846 |
|  | 791 (broad) | 818 | 827 |
|  |  | 769 | 743 |
|  |  | 682 | 682 |

Infrared absorption bands of mevalonic acid delta-lactone were 3370, 2930, 2890 (shoulder), 1705, 1475, 1456 (shoulder), 1404, 1379 (shoulder), 1338 (weak), 1337, 1303, 1266, 1232, 1157 (shoulder), 1130, 1073, 1026, 988, 968, 934, 905 (weak), 873, 828 (shoulder), 805, 761 (weak), 661 cm.$^{-1}$.

The following reaction equations represent the main reactions involved in the foregoing specific examples.

(3)
$$HOCH_2CH_2COCH_3 \xrightarrow{BrCH_2COBr}_{Pyridine} BrCH_2COOCH_2CH_2COCH_3$$

(4)
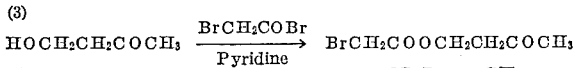

(5)
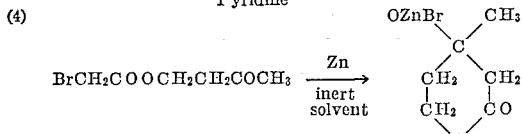

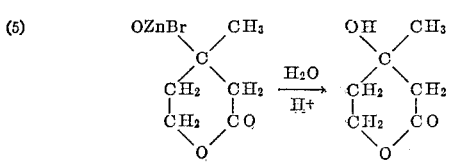

An alternative procedure for obtaining the same result as that indicated by Equation 3 is as follows:

(6)
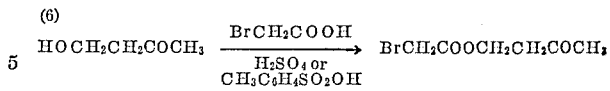

Although the synthesis of mevalonic acid delta-lactone has been used for illustration, the invention contemplates the synthesis of substituted mevalonic acid lactones, wherein the substituent groups do not interfere with either the esterification or the intramolecular Reformatsky reaction as described. The reactions, in these cases may be used in the same manner and therefore their specific exemplification is not necessary. In like manner, the synthesis of the other esters of the beta-hydroxy group of mevalonic acid delta-lactone is contemplated by the invention.

(7)
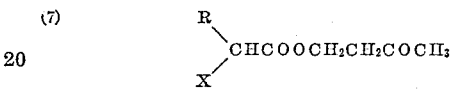

in which R stands for a member of the group consisting of organic groups, hydrogen and halogen and X stands for a halogen of the group consisting of Br, Cl and I. Such compounds undergo the Reformatsky reaction to give alpha-substituted mevalonic acid delta-lactones. Such compounds may be made by the use of the corresponding acetyl compounds in place of the bromoacetyl bromide of Equation 3.

(8)
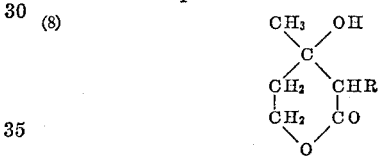

in which R stands for a member of the group consisting of organic groups and fluorine.

(9)

in which M stands for a metal of the group consisting of magnesium and zinc and X stands for a halogen of the group consisting of Cl, Br and I.

(10)
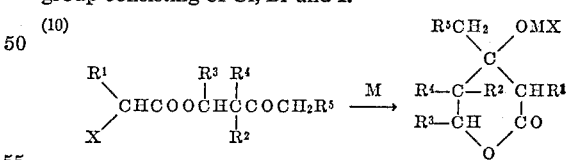

in which X stands for a halogen of the group consisting of Cl, Br and I, M stands for a metal of the group consisting of magnesium and zinc and R$^1$, R$^2$, R$^3$, R$^4$ and R$^5$ stands for a member of the group consisting of organic groups and fluorine.

(11)
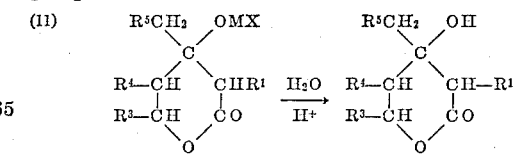

in which R$^1$, R$^3$, R$^4$ and R$^5$ stand for a member of the group consisting of organic groups and fluorine, M stands for a metal of the group consisting of zinc and magnesium and X stands for a halogen of the group consisting of Cl, Br and I.

The examples for preparation of the 4-(bromoacetoxy)-2-butanone and of mevalonic acid lactone do not restrict ranges and equivalents for operative conditions.

*Preparation of 4-(bromoacetoxy)-3,3-dimethyl-2-butanone.*—A mixture of 14.4 ml. (13.93 g., 0.12 mole) of 4-hydroxy-3,3-dimethyl-2-butanone and 17.0 g. (0.1225 mole) of bromoacetic acid in 15 ml. of benzene was refluxed for 24 hours, the resulting water from the reaction being separated in a benzene-water azeotrope trap. During the last 6 hours a drop of sulfuric acid was added as a catalyst, without effect. Seventy-nine percent of the theoretical amount of water was removed by the trap. The benzene solution was washed with sodium bicarbonate solution until the washings were alkaline.

The combined washings were extracted with an equal volume of ether (15 ml.) and added to the benzene solution. This mixture was washed twice with 5 ml. portions of water to remove any unreacted hydroxy-ketone, dried over anhydrous magnesium sulfate and evaporated in vacuo to 17.09 g. of crude product (60.1% of theorectical amount). A colorless fraction was distilled over at 118°/4 mm.

The use of benzene for the azeotropic removal of water should not be construed to eliminate the use of other water-azeotroping substances such as toluene, xylene or chloroform. The esterification example should not be construed to limit the synthesis of this new ester since other procedures are applicable.

*Preparation of 3,4,4-trimethyl-3-hydroxy-5-valerolactone.*—A Reformatsky reaction was carried out with 2.43 ml. (3.0 g., 0.0126 mole) of crude 4-(bromoacetoxy)-3,3-dimethyl-2-butanone, starting the reaction in refluxing sodium-treated tetrahydrofuran, stabilized with hydroquinone, over copper-coated, amalgamated zinc (1.0 g., 0.015 mole), but the reaction was completed in 2-methyl tetrahydrofuran.

After refluxing for 20 hours, no increase in color appeared. The zinc adduct was hydrolyzed by a solution of 2.1 g. of sodium bisulate monohydrate in 10 ml. of water, the organic solvents removed in vacuo and the aqueous suspension of organic material extracted three times with equal volumes of chloroform. On drying over anhydrous magnesium sulfate followed by evaporation in vacuo, 1.97 g. of a brown syrupy product was obtained in 60% of the theoretical amount.

We claim:
1. A method for the preparation of mevalonic acid and mevalonic acid delta-lactone which comprises first preparing an ester of 4-hydroxy-2-butanone and a halogen-substituted acetic acid of the general formula,

$$CXY_2COOH$$

wherein X is a member selected from the group consisting of chlorine, bromine and iodine, and Y is a member selected from the group consisting of chlorine, bromine, iodine and hydrogen by reacting said 4-hydroxy-2-butanone with said acid in an inert organic solvent at a temperature of the order of 4° C. in the presence of a dehydrating agent, and secondly, subjecting the resulting 4-(halogenacetoxy)-2-butanone to an internal cyclization by the Reformatsky reaction by treating an anhydrous inert, organic solvent solution thereof with a metal selected from the group consisting of zinc and magnesium, and hydrolyzing the resulting reaction product to produce mevalonic acid and mevalonic acid delta-lactone.

2. The method as defined in claim 1 wherein $$CXY_2COOH$$

is bromoacetic acid.

3. A method for the preparation of mevalonic acid and mevalonic acid delta-lactone which comprises first preparing an ester of 4-hydroxy-2-butanone and a halogen-substituted acetic acid of the general formula $$CXY_2COOH$$

wherein X is a member selected from the group consisting of chlorine, bromine and iodine, and Y is a member selected from the group consisting of chlorine, bromine, iodine and hydrogen by esterifying said 4-hydroxy-2-butanone with an acyl halide of said acid in an inert solvent at a temperature of the order of −78° C. in the presence of a hydrogen-halide-removing agent, and secondly, subjecting the resulting 4-(halogenacetoxy)-2-butanone to an internal cyclization by the Reformatsky reaction by treating an anhydrous inert organic solvent solution thereof with a metal selected from the group consisting of zinc and magnesium, and hydrolyzing the resulting reaction product to produce mevalonic acid and mevalonic acid delta-lactone.

4. The method defined in claim 3 wherein the acid halide of the formula $CXY_2COOH$ is bromoacetyl bromide.

References Cited in the file of this patent
UNITED STATES PATENTS

| | | |
|---|---|---|
| 2,653,943 | Kogl et al. | Sept. 29, 1953 |
| 2,824,888 | Raasch | Feb. 25, 1958 |
| 2,831,884 | Pommer et al. | May 31, 1958 |
| 2,912,441 | Montagna et al. | Nov. 10, 1959 |
| 2,995,576 | Kagan et al. | Aug. 8, 1961 |

OTHER REFERENCES

Nazarov et al.: Chemical Abstracts, vol. 52, pages 4619 and 4620 (1958).

Hoffman et al.: Jour. Amer. Chem. Soc., vol. 79, pages 2316–2318 (1957).

Theilheimer: Synthetic Methods of Organic Chemistry, Interscience, New York, vol. 1, page 198 (1948).